US006829224B1

(12) United States Patent
Goldman et al.

(10) Patent No.: US 6,829,224 B1
(45) Date of Patent: *Dec. 7, 2004

(54) METHOD AND APPARATUS FOR SMOOTHING THE RATE OF PACKET DISCARDS FOR RANDOM EARLY DETECTION IN AN ATM SWITCH

(75) Inventors: Gary S. Goldman, San Jose, CA (US); Mohammed Nikuie, Mountain View, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,423

(22) Filed: Feb. 4, 1999

(51) Int. Cl.[7] .................................................. H04L 1/00
(52) U.S. Cl. .................................. 370/252; 370/395.21
(58) Field of Search ............................... 370/235–237, 370/249, 252, 352, 412, 395.1, 395.21

(56) References Cited

U.S. PATENT DOCUMENTS

| 5,764,641 | A | 6/1998 | Lin |
| 6,282,171 | B1 | 8/2001 | Adams et al. |
| 6,333,917 | B1 * | 12/2001 | Lyon et al. .................. 370/236 |
| 6,345,037 | B2 | 2/2002 | St-Denis et al. |
| 6,434,116 | B1 * | 8/2002 | Ott ............................ 370/235 |
| 6,463,068 | B1 * | 10/2002 | Lin et al. .................... 370/414 |

OTHER PUBLICATIONS

*Random Early Detection Gateways for Congestion Avoidance*, Sally Floyd and Van Jacobson, Lawrence Berkeley Laboratory, University of California, Aug. 1993, pp. 1–32.

The ATM Forum, Technical Committee, *Utopia Level 2, Version 1.0*, af–phy–0039.000, Jun. 1995, pp. 1–66.

Y. Li and S. Elby. "TCP/IP Performance and Behavior Over an ATM Network". 1996 IEEE. pp. 1–9.

H. Chiou and Z. Tsai. "Performance of ATM Switches with Age Priority Packet Discarding under the On–Off Source Model". 1998 IEEE. pp. 931–938.

M. Casoni. "Early Packet Discard with Diverse Management Policies for EOM Cells". 1997 IEEE. pp. 33–37.

Nathan Harwell, "TCP Over ATM", Internet Web Site, Nov. 5, 1998, 5, http://ils.unc.edu/atm/.

* cited by examiner

*Primary Examiner*—Alpus H. Hsu
*Assistant Examiner*—Toan D. Nguyen
(74) *Attorney, Agent, or Firm*—Blakely, Sokoloff, Taylor & Zafman LLP

(57) ABSTRACT

A method and apparatus for smoothing the rate of packet discards for random early detection ("RED") in a communication device such as an ATM switch is described. The ATM switch includes a plurality of class of service queues. An accumulated discard probability is stored independently for each class of service queue. With the arrival of each packet (frame), an instantaneous discard probability is calculated. The sum of the instantaneous discard probability and the accumulated discard probability becomes the effective probability for discard. If the effective discard probability is greater than (or equal to) a random number, the cell is discarded, and the accumulated discard probability is cleared. Otherwise, the sum is stored back as the new value for the accumulated discard probability. The accumulated discard probability may optionally be cleared if a class of service queue's current cell count is zero. Additionally, if the instantaneous discard probability caused the accumulated discard probability to increase too fast, causing too many discards, a programmable accumulation factor may be multiplied by the instantaneous discard probability.

29 Claims, 7 Drawing Sheets

METHOD AND APPARATUS FOR SMOOTHING THE RATE OF PACKET DISCARDS FOR RANDOM EARLY DETECTION IN AN ATM SWITCH

1. FIELD OF THE INVENTION

The present invention relates generally to communication systems, and specifically, to a method and apparatus for smoothing the rate of packet discards for random early detection in a communication device.

2. BACKGROUND

Asynchronous Transfer Mode ("ATM") networks are cell switching networks that transfer fixed length data units called "cells." Cells are transmitted from a source node to a destination node through ATM (or digital) switches, which are coupled together by way of communication lines. An ATM switch includes a plurality of input ports coupled to input communication lines and a plurality of output ports coupled to output communication lines.

Cells carry voice, video, and data information from the source node to the destination node. Cells are fifty-three bytes in length and include five bytes of header information and forty-eight bytes of payload. The header information includes a virtual path identifier ("VPI") field and a virtual channel identifier ("VCI") field, identifying the next destination of a cell as it passes through a series of ATM switches on its way to its destination node. ATM switches asynchronously receive cells on the input ports and switch the cells to the proper output ports based on the VPI and VCI information in the header of the cells.

Each communication line can carry several different connections simultaneously. Queues are typically used within an ATM switch for temporarily storing cells prior to transmission on a communication line. More than one queue may be used to service different types of class of service connections. For example, cells belonging to higher priority connections (e.g., voice connections) may be stored in queues that are marked as higher priority. On the other hand, cells belonging to lower priority connections (e.g., data) may be stored in queues that are marked as lower priority.

These queues, which have a finite size, must be able to store cells for each connection. Thus, in an ATM switch architecture, it is essential to efficiently use buffer resources, while remaining fair to all connections. Moreover, since queues have a finite size, threshold values are assigned to the queues to define a maximum number of cells that can be stored for each connection. Consequently, one function of an ATM switch is to determine whether to accept or reject cells depending on whether the queue that the cell belongs to has reached its maximum threshold.

The ATM Adaptation Layer ("AAL") is utilized to segment higher layer packets into cells for transporting Transmission Control Protocol/Internet Protocol ("TCP/IP") traffic over ATM networks. If a cell is discarded by an ATM switch, the entire packet that the cell belongs to is dropped. If TCP/IP packets from several sources are dropped at substantially the same time, a global synchronization problem is likely to occur. Global synchronization occurs when source nodes react to dropped packets synchronously, slowing retransmission of packets. When the source nodes determine that the network is not congested, they begin to retransmit packets at a higher rate, thereby causing congestion again. This type of oscillating behavior reduces throughput.

One technique for solving TCP global synchronization has been proposed by Sally Floyd and Van Jacobson, entitled "Random Early Detection Gateways for Congestion Avoidance", published in August 1993 by IEEE/ACM Transactions on Networking. According to Floyd/Jacobson, a random early detection ("RED") algorithm is employed to smooth the distribution of cell discards over time, thereby reducing TCP global synchronization and improving performance.

However, RED is not well suited in high-speed implementations in hardware since it requires multiplication and division operations. Prior art techniques may have performed the multiplication/division smoothing function of RED in software, or used a look-up table in hardware, which is either expensive in terms of chip die area or has limited precision.

SUMMARY OF THE INVENTION

A method for smoothing a rate of cell discards for random early detection in a communication device is described. A cell is detected and an instantaneous discard probability is calculated. The method includes updating a discard probability as a function of the instantaneous discard probability and an accumulated probability, and comparing the discard probability with a random number. If the discard probability is greater than the random number, the cell is discarded, otherwise the cell is accepted.

Other objects, features, and advantages of the present invention will be apparent from the accompanying drawings and from the detailed description that follows below.

BRIEF DESCRIPTION OF THE DRAWINGS

The present invention is illustrated by way of example and not limited in the figures of the accompanying drawings in which like references indicated similar elements and in which.

DETAILED DESCRIPTION

A method and corresponding apparatus is described for smoothing a rate of cell discards for random early detection in a communication device such as, for example, an ATM switch. An instantaneous discard probability is calculated when a cell is detected. The discard probability is then calculated as a function of the instantaneous discard probability and an accumulated probability. The discard probability is compared with a random number to determine whether to accept or discard the cell. If the discard probability is greater than the random number, the cell is discarded, otherwise the cell is accepted.

One intended advantage of one embodiment includes improving the performance of random early detection for TCP congestion avoidance by smoothing the rate of cell discards over time. This is performed in software and/or hardware using fast logic.

Figure 1:
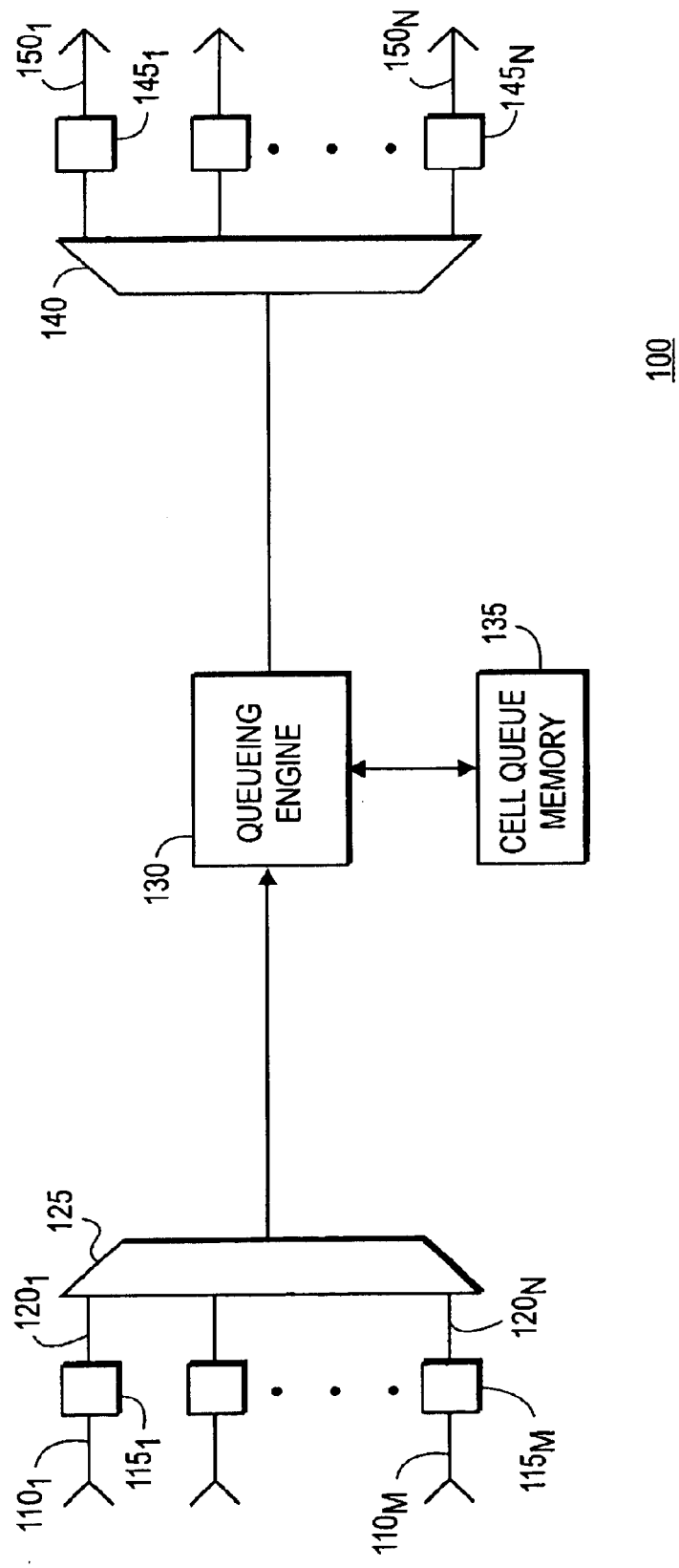
FIG. 1 is a block diagram of a communication switch.

FIG. 1 is a block diagram of a communication switch 100. In one embodiment, the communication switch 100 is an asynchronous transfer mode ("ATM") switch. Alternative embodiments may be implemented in other types of communication devices such as, for example, gateways, routers, and the like. Referring to FIG. 1, the ATM switch 100 includes a plurality of input communication lines $110_1$–$110_M$ (or ports) coupled to corresponding physical interfaces $115_1$–$115_M$, where M is a positive whole number. The physical interfaces $115_1$–$115_M$ convert signals from one interface to another, and provide data units on signal lines $120_1$–$120_M$. In one embodiment, the data units comprise fixed length ATM cells, although the communication switch 100 may support other types of data units such as, for example, data packets (e.g., in the case of a router). The cells are fifty-three bytes in length that includes five bytes of header information and forty-eight bytes of payload. One or more ATM cells are encapsulated into a frame.

The signal lines $120_{1-120M}$ are coupled to inputs of an ingress multiplexer ("mux") 125 which transfers cells from the signal lines $120_1$–$120_M$ to a queuing engine 130 in a time-multiplexed manner. In one embodiment, the ingress mux 125 allocates 1/Mth of a fraction of time to each input line. The queuing engine 130 performs, among other things, three major functions for each cell that is received, namely, (i) determining the destination of the cells (i.e., cell routing); (ii) determining whether to accept or reject the cells depending on the amount of congestion; and (iii) providing bandwidth management, i.e., transmitting cells from different queues according to the queues' respective priorities and allocated bandwidth.

The queuing engine 130 is coupled to a cell queue memory 135, which may include one or more synchronous dynamic random access memory ("SDRAM") devices. The queuing engine 130 stores cells to and retrieves cells from the memory 135. The organization of the cell queue memory 135 will be described in more detail below.

The output of the queuing engine 130 is coupled to a demultiplexer 140. The demultiplexer 140 is coupled to output communication lines $150_1$–$150_N$ (or ports), through physical interfaces $145_1$–$145_N$, where N is a positive whole number. The queuing engine 130 determines the output port that the cells are to be transmitted to and commands the demultiplexer 140 to direct the cells to the appropriate output port. The input and output communication lines $110_1$–$110_M$ and $150_1$–$150_N$ may include, but is not limited or restricted to, optical fibers, twisted pairs of wires, coaxial cables, and switches and support one or more of the following standards including, but not limited, or restricted to, T1, T3, OC3, OC12, and OC48.

Figure 2:
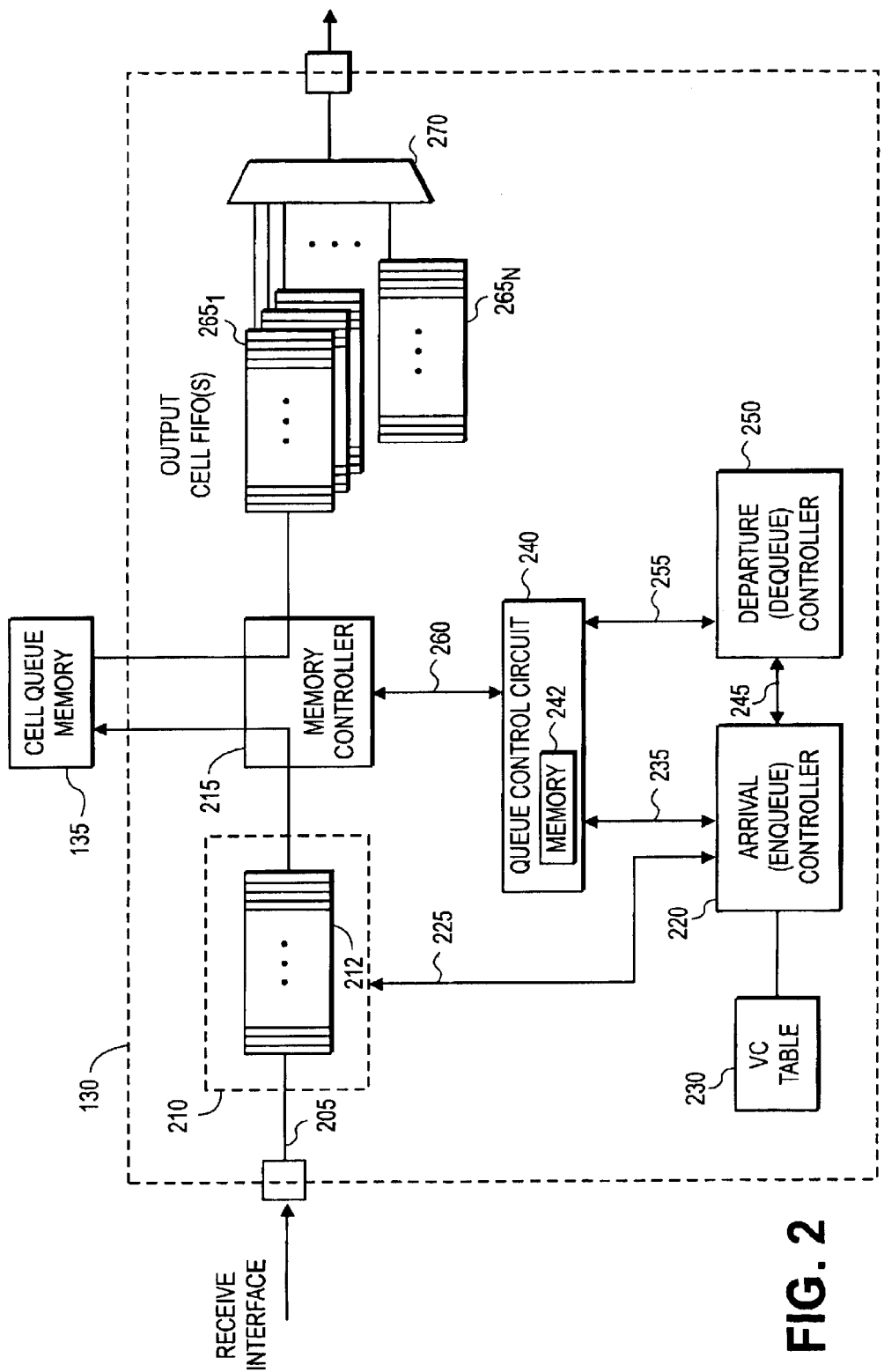
FIG. 2 illustrates a block diagram of a queuing engine.

FIG. 2 illustrates a block diagram of a queuing engine 130. Referring to FIG. 2, the queuing engine 130 includes an input engine 210 having a cell first-in first-out ("FIFO") 212 for temporarily storing cells received over parallel interface 205. In one embodiment, the parallel interface 205 is a Universal Test and Operations Physical Interface for ATM ("UTOPIA") interface, entitled UTOPIA, Level 2, Version 1.0, published in June 1995 by the ATM Forum. The depth of the input cell FIFO 210 may vary to meet the arrival rate of the cells received over the UTOPIA interface, though is generally small (e.g., 16 cells deep).

The input engine 210 transmits the header information of each arriving cell to an arrival controller 220 by way of signal lines 225. In particular, the arrival controller 220 reads the virtual channel identifier ("VCI") and virtual path identifier ("VPI") information in the header of each cell, performs a table lookup in a mapping table (hereinafter referred to as "VC table") 230, and transmits the new VPI/VCI information to the input engine 210 for modifying the header information. The arrival controller 220 also determines the output port that the cell is to be transmitted to, and determines whether to accept or reject the cells, as will be described in more detail below. In one embodiment, the VC table 230 is contained within a volatile memory device, though the VC table 230 may be contained in any other type of memory device. The VC table 230 includes configuration information for each virtual connection ("VC") that is established, and is updated as connections are created and destroyed. The configuration information is described in more detail with respect to FIG. 4.

Once the arrival controller 220 transmits the new VPI/VCI information to the input engine 210 by way of signal lines 225, the input engine 210 modifies the header of the cell to the new values. The input engine 210 then transmits the cell to the memory controller 215. The memory controller 215 stores the cell in a queue within the cell queue memory 135 and transmits a pointer to the cell to a queue control circuit 240. The queue control circuit 240 includes a memory 242 (e.g., a combination of random access memory "RAM" and read only memory "ROM") for storing various values such as pointers, threshold values, queue cell counts, and the like. The queue control circuit 240 keeps track of the cells in queues within the cell queue 135 by way of a linked list, which may be contained in part of the memory 242. The linked list is updated to link the cell only if instructed to do so by the arrival controller 220. The arrival controller 220 performs threshold and random early detection checking to determine whether to accept or reject cells. The criteria(ion) for accepting or rejecting cells will be described in more detail in the following paragraphs. If the arrival controller 220 accepts the cell, the queue control circuit 240 is directed to link the cell to the linked list maintained in the memory 242. On the other hand, if the cell is rejected, the arrival controller 220 does nothing or instructs the queue control circuit 240 not to link the cell to the end of a queue.

Figure 3:
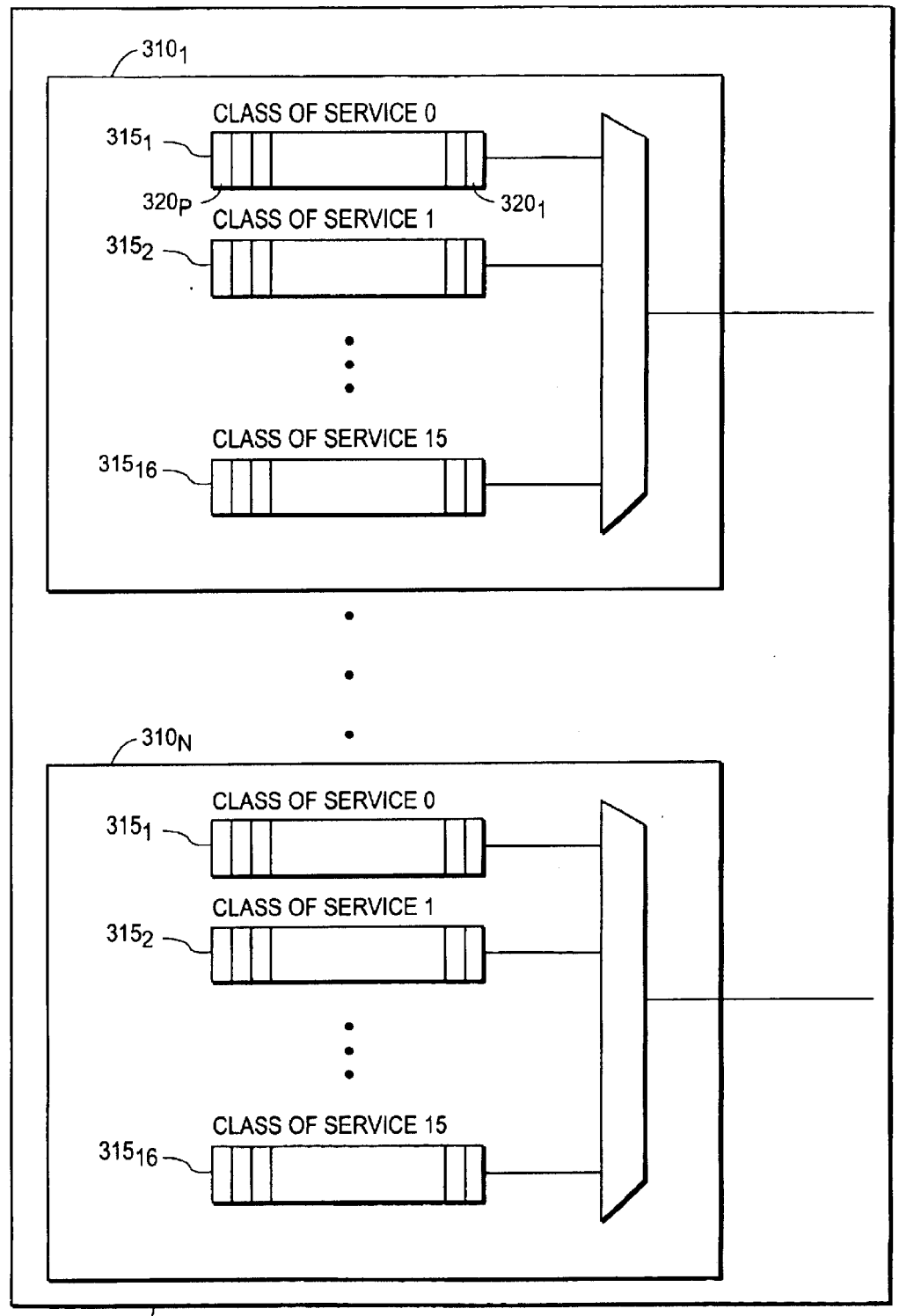
FIG. 3 shows an organization of the cell queue memory.

FIG. 3 shows an organization of the cell queue memory 135. Referring to FIG. 3, the cell queue memory 135 is broken up into a plurality of queue groups $310_1$–$310_N$ ("310") which are associated with the number of output ports (or virtual interface) supported. Each queue group 310 is further broken up into one or more class of service queues. For example, queue group 310, includes, for example, sixteen class of service queues $315_1$–$315_{16}$ ("315"). The number of class of service queues is a matter of design choice and may vary from one implementation to another.

The class of service queues 315 typically represent priority levels depending on the cell type. For example, cells belonging to higher priority connections (e.g., voice cells) are stored in class of service queues that have a higher priority of service, while cells belonging to lower priority connections (e.g., data cells) are stored in class of service queues that have a lower priority of service. Each VC is assigned to a particular class of service queue depending on its traffic type (e.g., voice, data, etc.). Incoming cells are stored at the end of the class of service queue that corresponds to the cell's VC, while outgoing cells are retrieved from the head of the class of service queue that corresponds to the cell's VC.

More than one VC may be assigned to a class of service queue. Accordingly, each class of service queue 315 includes one or more VC queues $320_1$–$320_P$ ("320"), where "P" is a positive whole number.

A common memory pool is shared by all the class of service queues in the queue groups $310_1$–$310_N$. As described above, the class of service queues are maintained by forming linked lists of buffers from the common memory pool. When a VC is configured to buffer cells to a VC queue 320 within a class of service queue 315, a linked list of the cells is maintained.

Referring back to FIG. 2, if a cell is accepted (i.e., the queue group 310, class of service queue 315, and/or VC queue 320 have room for the cell), the cell is stored in the class of service queue that belongs to the cell's VC. The arrival controller 220 is coupled to the queue control circuit 240 which stores statistics about the class of service queues maintained within the cell queue memory 135. These statistics includes cell counts for each queue group 310 and class of service queue 315, threshold values, etc.

The departure controller 250 controls the rate at which cells depart from the queuing engine 130 depending on the configuration of the queues and the amount of cells in the queues. For each cell that is received and accepted, the arrival controller 220 indicates to the departure controller 250 by way of signal line(s) 245 that a cell has been received. Consequently, the departure controller 250 keeps track of the cell counts of the queues. The departure controller 250 is also coupled to the queue control circuit 240 for determining the queues that contain cells. Based on the queue cell counts, and priority information of the queues, the departure controller 250 then determines which queue to service. The departure controller 250 directs the queue control circuit 240 by way of signal line(s) 255 to retrieve cells from the cell queue memory 135 and place them in one of the output FIFOs $265_1$–$265_N$. The number of FIFOs corresponds to the number of output ports. The output FIFOs $265_1$–$265_N$ are coupled to an output mux 270 for transmitting cells to the demultiplexer 140 (FIG. 1).

Figure 4:
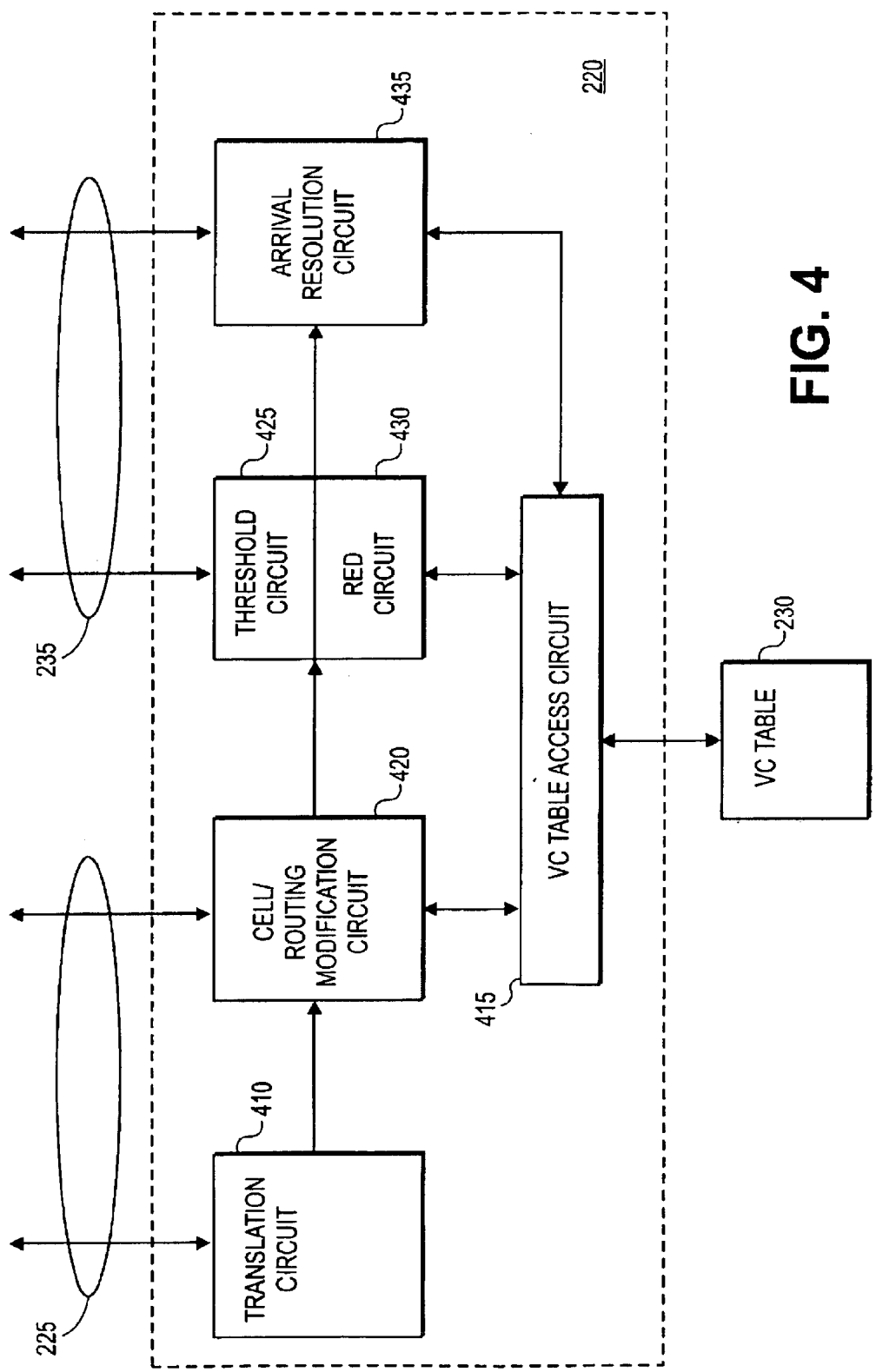
FIG. 4 is a block diagram of the arrival controller of FIG. 2.

FIG. 4 is a block diagram of the arrival controller 220 of FIG. 2. The arrival controller 220 performs arrival processing in a pipelined fashion. More specifically, the arrival controller 220 determines, among other things, (i) the connection to which the cell belongs, (ii) the cell type, and (iii) whether to accept or discard the cell.

Referring to FIG. 4, the arrival controller 220 includes a translation circuit 410 which receives the header of each cell by way of signal lines 225 and translates the VPI/VCI information into a connection identification number. The translation circuit 410 then transmits the connection identification number to a cell routing/modification circuit 420. The cell routing/modification circuit 420 uses the connection identification number as a pointer in the VC table 230 through a VC table access circuit 415. The VC table 230 then provides various values regarding the VC to the cell routing/modification circuit 420. The values include, among other things, the new VPI/VCI values for the cell, the VC cell count, the class of service queue within a queue group that the cell belongs to, etc.

The cell routing/modification circuit 420 receives the new VPI/VCI values that correspond to the connection identification number and transmits the values to the input engine 210 (FIG. 2) by way of signal lines 225. The input engine 210 modifies the header of the cell to the new VPI/VCI values, and transmits the cell to the memory controller 215 for storing the cell in the cell queue memory 135. The cell routing/modification circuit 420 then determines which class of service queue to link the cell to. This information is retrieved from the VC table 230 and is forwarded to an arrival resolution circuit 435. However, before linking the cell, the arrival controller 220 first determines whether to accept or reject the cell.

The cell routing/modification circuit 420 is coupled to a threshold circuit 425 and a random early detection circuit ("RED") circuit 430, both of which are coupled to the queue control circuit 240 by way of signal lines 235 for retrieving various threshold values, cell counts, queue depths, etc., for the class of service queue involved. Both the threshold circuit 425 and the RED circuit 430 perform separate functions in parallel.

The threshold circuit 425 performs threshold checking which involves checking the cell count for the class of service queue that the incoming cell belongs to and comparing the cell count to a maximum threshold for that queue. If the cell count is greater than the maximum threshold, then the cell is discarded.

The RED circuit 430 reads the cell headers and randomly discards start of frame ("SOF") cells and the associated frame with increasing probability as the class of service queue's time-averaged memory utilization increases (toward a maximum threshold). The RED circuit 430 maintains the average queue length latency to an acceptably low level by limiting the average queue depths, while the full queue depth, up to a predetermined threshold, is available to support data bursts.

For each SOF cell, the RED circuit 430 calculates a discard probability ($P_{DISC}$) which is determined from the average class of service queue length ($Q_{AVG}$), maximum and minimum RED thresholds ($TH_{MAX}$ and $TH_{MIN}$), a maximum discard probability ($P_{MAXDISC}$), and an accumulated probability ($P_{ACCUM}$) The discard probability is the sum of an instantaneous discard probability ($P_{INST}$), which is determined for each SOF cell that arrives, plus the accumulated discard probability ($P_{ACCUM}$), which gradually increases over time, as described by the following expression:

$$P_{DISC}=P_{INST}+P_{ACCUM} \quad (1)$$

where:

$P_{INST}=0$ (if $Q_{AVG}<=TH_{MIN}$)

$P_{INST}=1$ (if $Q_{AVG}>=TH_{MAX}$), and $$P_{INST}=P_{MAXDISC}*((Q_{AVG}-TH_{MIN})/(TH_{MAX}-TH_{MIN})) \text{ (if } TH_{MIN}<Q_{AVG}<TH_{MAX}). \quad (2)$$

And, $P_{ACCUM}=0$ (if length of queue=0), $$P_{ACCUM}=P_{ACCUM}+(ACCUM\_FACTOR*P_{INST}) \text{ (if length of queue>0).} \quad (3)$$

Figure 5A:
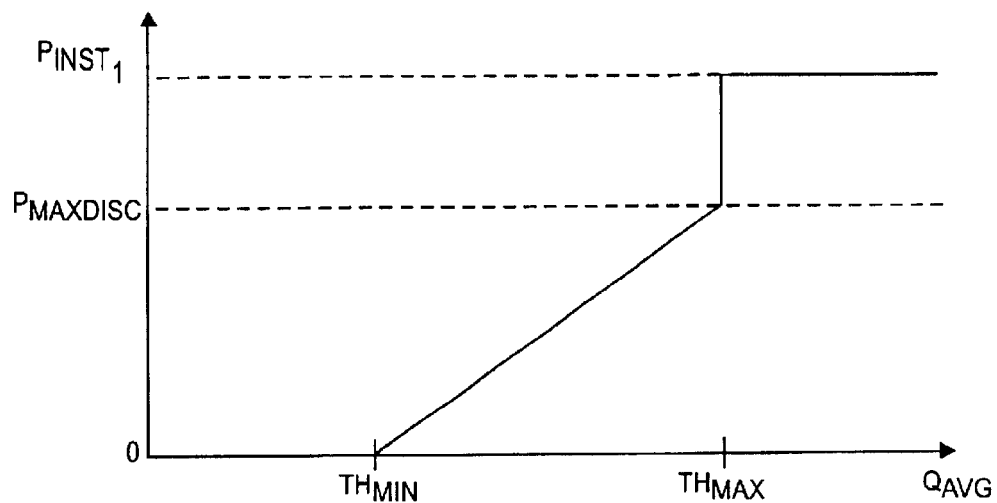
FIG. 5A is a graphical representation of a random early detection instantaneous discard probability as a function of the average cell count.

FIG. 5A is a graphical representation of a random early detection instantaneous discard probability as a function of the average cell count. Referring to FIG. 5A, the instantaneous discard probability ($P_{INST}$) increases linearly with the average queue length ($Q_{AVG}$), from zero to the maximum discard probability ($P_{MAXDISC}$), when $Q_{AVG}$ is between the $TH_{MIN}$ and $TH_{MAX}$ thresholds. If $Q_{AVG}$ is below $TH_{MIN}$, the probability becomes zero. On the other hand, if $Q_{AVG}$ is above $TH_{MAX}$, the probability becomes one. The accumulation factor (ACCUM_FACTOR) is a programmable weighting factor of the instantaneous discard probability's contribution to the accumulated probability. Since the instantaneous discard probability ($P_{INST}$) is added to the accumulated probability ($P_{ACCUM}$), the accumulation factor is provided to prevent $P_{ACCUM}$ from growing too fast and causing excessive cell (and frame) discards.

With each successive frame that is accepted, the accumulation probability increases by the current frame's instantaneous discard probability multiplied by an accumulation factor. Consequently, the discard probability increases over time until a frame is discarded. Thereafter, the accumulated probability is reset to zero. This reduces clumping of discarded frames in time, smoothing the discard interval. Smoothing the discard interval reduces TCP global synchronization, thereby enhancing TCP performance. Additionally, if a class of service queue's cell count is zero, the accumulated probability for that queue may be optionally reset to zero. This may be useful because the average cell count $Q_{AVG}$ may lag significantly behind the current cell count, and inflating the discard probability may not be desirable when the class of service queue is empty.

The RED discard probability derived by Floyd/Jacobson is given by the following expression:

$$P_{DISC}=(P_{INST}/(1-(\text{count}*P_{INST}))), \quad (4)$$

where "count" is the number of "unmarked" (not discarded) packets (or frames) that have arrived since the last marked (discarded) packet (or frame).

Figure 5B:
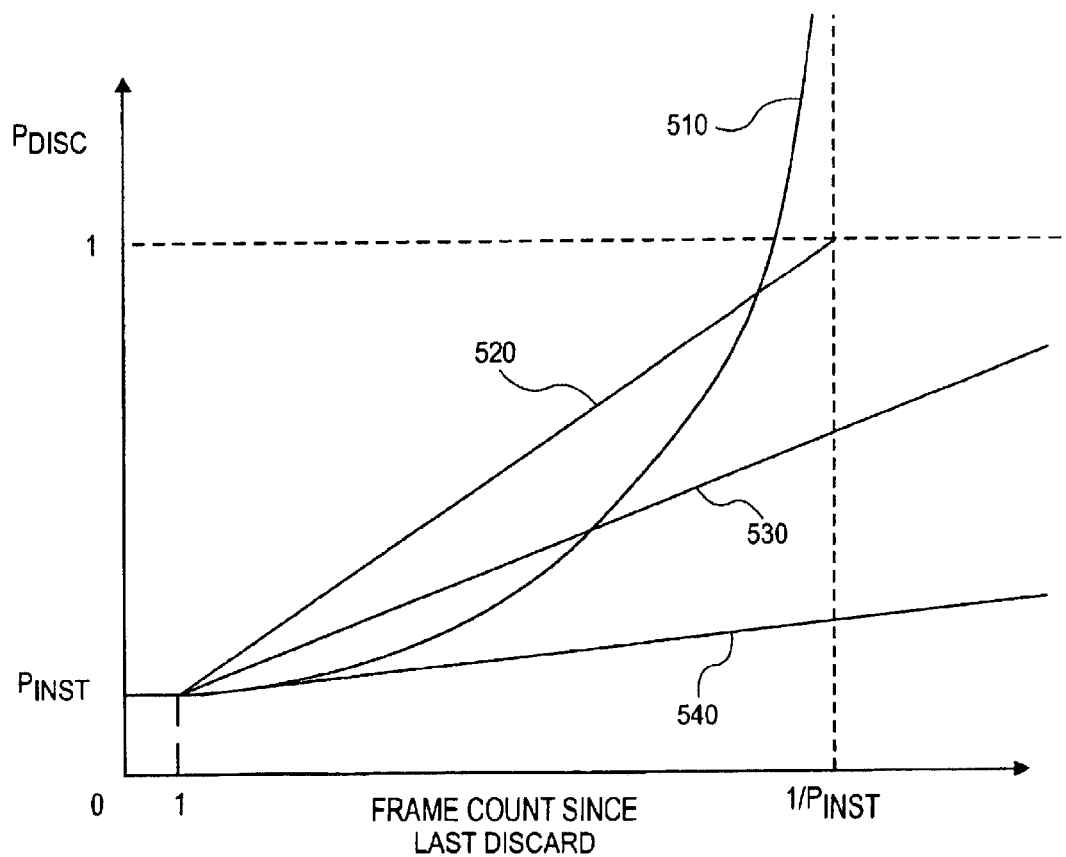
FIG. 5B is a graph showing a comparison between the discard probability of the Floyd/Jacobson algorithm and the accumulated discard probability of equation (3)

FIG. 5B is a graph showing a comparison between the discard probability of the Floyd/Jacobson algorithm and the accumulated discard probability of equation (3). As shown therein, the Floyd/Jacobson algorithm as expressed by equation (4), is shown by curve 510. One or more embodiments described herein approximate the Floyd/Jacobson curve 510 over a desired range. Curve 520 illustrates equation (3) where the ACCUM_FACTOR is one. Curves 530 and 540 illustrate equation (3) where the ACCUM_FACTOR is 1/2 and 1/16, respectively. The Floyd/Jacobson curve 510 is not a linear curve, therefore requiring a multiplication and a division to determine the discard probability. This is disadvantageous because the calculation of the discard probability consumes too much time, especially since many such calculations must be continually performed. The curves 520, 530, and 540, however, are linear approximations of the curve 510 and effectuate the intent of RED by performing congestion avoidance in hardware using simple and fast logic.

Referring back to FIG. 4, the RED circuit 430 retrieves the maximum discard probability ($P_{MAXDISC}$), maximum and minimum RED thresholds ($TH_{MAX}$ and $TH_{MIN}$), and probability accumulation factor (ACCUM_FACTOR) from the memory 242 contained within the queue control circuit 240 (FIG. 2) for the class of service queue that the cell belongs to. These value, are programmable (but typically static) and may vary from one class of service queue to another. Moreover, these values may be loaded into memory 242 during a power on reset (e.g., of the communication switch 100). The RED circuit 430 also retrieves the time-averaged cell queue count ($Q_{AVG}$), the current cell count for the class of service queue involved, and the accumulated discard probability ($P_{ACCUM}$) from the memory 242. These values are updated regularly for each class of service queue.

The outputs of the RED circuit 430 include DISCARD and $P_{ACCUM}$ (updated). These outputs are transmitted to the arrival resolution circuit 435. The arrival resolution circuit 435 updates the VC cell count (in the case of cell acceptance) in the VC table 230 by way of the VC table access circuit 415, and stores the updated accumulated probability ($P_{ACCUM}$) in memory 242 of the queue control circuit 240 (FIG. 2) by way of signal lines 235. The arrival resolution circuit 435 also indicates to the queue control circuit 240 whether to accept or reject the cell depending on the DISCARD output of the RED circuit 430. If DISCARD is a one, indicating a discard, the cell is not linked to the class of service queue. If DISCARD is a zero, indicating an acceptance, the arrival resolution circuit 435 instructs the queue control circuit 240 to link the cell to the end of the class of service queue that the cell belongs to. This information is either received from the cell routing/modification circuit 420 or is retrieved from the VC table 230.

Figure 6:
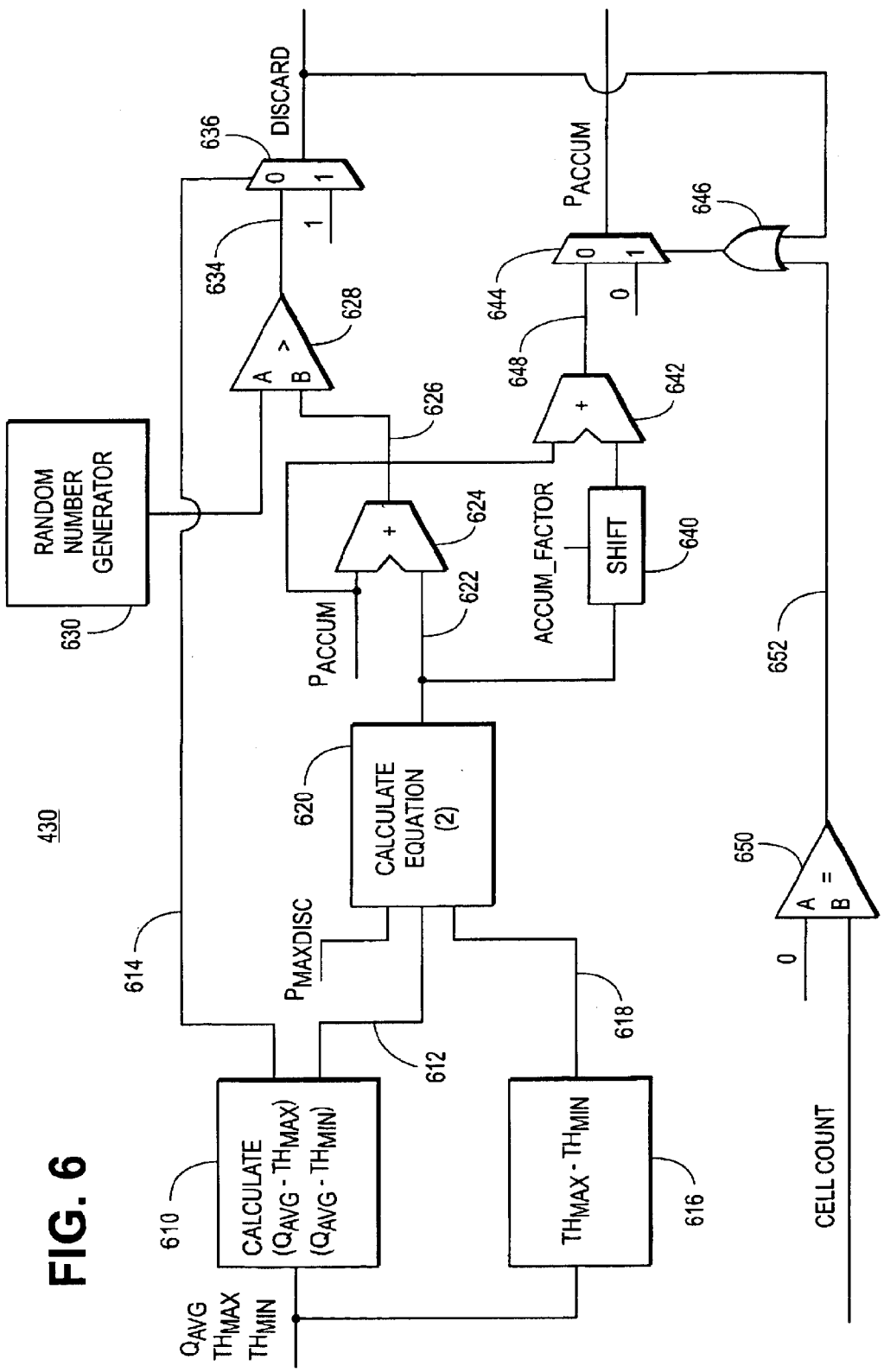
FIG. 6 illustrates a block diagram of the RED circuit.

FIG. 6 illustrates a block diagram of the RED circuit 430. The RED circuit 430 may be implemented in a pipelined manner or other ways such as by way of combinational logic. Referring to FIG. 6, the RED circuit 430 includes a circuit 610 which receives inputs $Q_{AVG}$, $TH_{MAX}$ and $TH_{MIN}$. In circuit 610, $TH_{MIN}$ is subtracted from $Q_{AVG}$ and the result is provided to circuit 620 by way of signal line(s) 612. $TH_{MAX}$ is also compared with $Q_{AVG}$. If $Q_{AVG}$ is greater than (or equal to) $TH_{MAX}$, then a signal on signal line 614 will be a one (indicating a discard), otherwise the signal will be a zero.

In circuit 616, the value ($TH_{MAX}-TH_{MIN}$) is determined and the result is provided to circuit 620 by way of signal line(s) 618. In one embodiment, $TH_{MAX}$ is a programmable value that is expressed in exponent form, which is offset by six to provide the range $2^6$ to $2^{21}$ cells with a four-bit field. Other types of representations in exponent form may be used. $TH_{MIN}$ is a programmable value and is 0, 1/2,3/4, or 7/8 of $TH_{MIN}$. Thus, the calculation ($TH_{MAX}-TH_{MIN}$) is constrained to a power of two. This calculation may be accomplished numerous other ways.

Circuit 620 receives ($Q_{AVG}-TH_{MIN}$) on signal line(s) 612, ($TH_{MAX}-TH_{MIN}$) on signal line(s) 614, and $P_{MAXDISC}$ to calculate equation (2). The portion (($Q_{AVG}-TH_{MIN}$)/($TH_{MAX}-TH_{MIN}$)) in equation (2) becomes a simple shift. The average cell count $Q_{AVG}$ is expressed in floating-point format with five bits of mantissa. As a result, the division (($Q_{AVG}-TH_{MIN}$)/($TH_{MAX}-TH_{MIN}$)) has a five-bit resolution. The maximum discard probability ($P_{MAXDISC}$) is a programmable value represented as $2^{-n}$, allowing values from 100% ($2^0$) to 0.78% ($2^{31\ 7}$) with a three-bit field. The calculation of $P_{INST}$ then becomes a right shift of the five-bit fraction, shifting anywhere from zero to seven bit positions. This yields a twelve-bit fraction for $P_{INST}$. Circuit 620 provides $P_{INST}$ on signal line(s) 622.

Adder 624 adds $P_{INST}$ to $P_{ACCUM}$, and provides the result $P_{DISC}$ on signal line(s) 626. In one embodiment, $P_{DISC}$ is a 12-bit fraction, taking on values from 0/4096 to 4095/4096 in 1/4096 increments. $P_{DISC}$ is fed to one input of a comparator 628. A pseudo-random number generator 630 generates a 12-bit random number, ranging between 0.0 and 1.0, is fed to another input of the comparator 628. The pseudo-random number generator 630 generates the random number using a 23-bit linear feedback shift register based on the equation $x^{23}+x^{18}+1$. The polynomial cycles through $2^{23}-1$ values before repeating. If $P_{DISC}$ is greater than (or equal to) the random number generator value, then a one is provided on signal line 634, otherwise a zero is provided. The signal line 634 is coupled to one input of mux 636. A logic one is coupled to the other input of the mux 636. The output of mux 636 is the DISCARD signal. If the signal on signal line 614 is a one, indicating a discard condition, then the DISCARD value is forced to a one. On the other hand, if the signal on signal line 614 is a zero, then the signal on signal line 634 is the DISCARD value.

The output of circuit 620 ($P_{INST}$) is also fed to a shift register 640. The ACCUM_FACTOR is fed to a control terminal of the shift register 640 and determines the amount that $P_{INST}$ is to be scaled, if any. The ACCUM_FACTOR is a negative power of two having exemplary values such as 1, 1/2, 1/4, 1/8, 1/16, 1/32, etc. The output of the shift register 640 is coupled to a first input of adder 642, with $P_{ACCUM}$ being fed to the second input of adder 642. Adder 642 provides the updated accumulated probability ($P_{ACCUM}$) on signal line(s) 648, which is coupled to one input of mux 644. The other input of mux 644 is a zero. The mux 644 is controlled by an "OR" gate 646. The inputs to the "OR" gate include an output of comparator 650 and the DISCARD output of the mux 636. If either input of the "OR" gate is a logic one, then $P_{ACCUM}$ will be reset to zero.

The first condition that causes $P_{ACCUM}$ to be reset is if the current cell count is zero. The current cell count is compared to zero by comparator 650, which provides an output on signal line 652. If the current cell count is zero, then the output on signal line 652 will be a one, causing a reset of $P_{ACCUM}$. Otherwise, if the current cell count is non-zero, then the output on signal line 652 will be a zero. This first condition is optional such that $P_{ACCUM}$ need not be reset to zero, despite the fact that the current cell count is zero. The second condition that causes $P_{ACCUM}$ to be reset to zero is when there is a discard (i.e., DISCARD equal to one).

Figure 7:
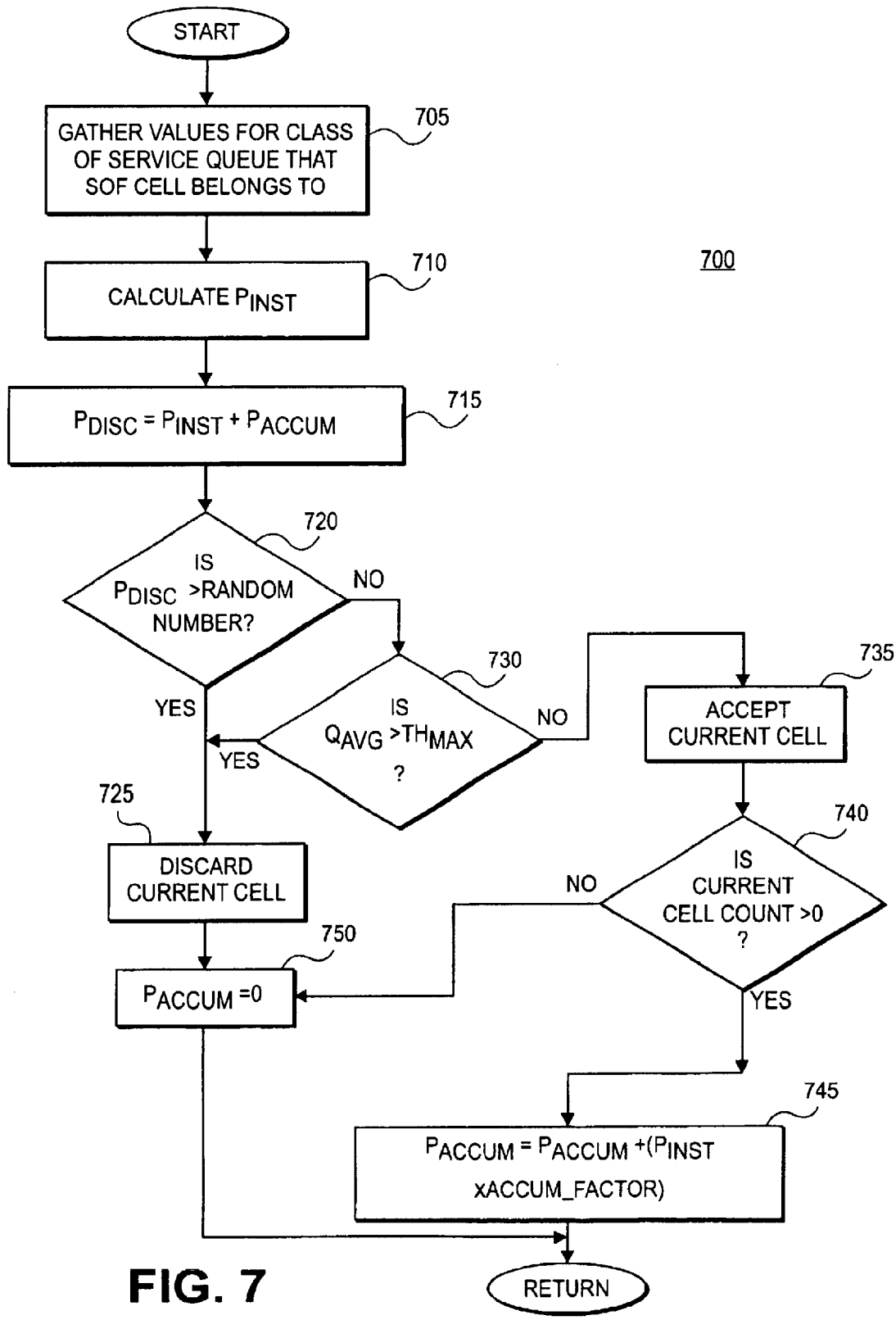
FIG. 7 is a flow diagram illustrating a process for determining whether to accept/discard a cell and updating the accumulated discard probability.

FIG. 7 is a flow diagram illustrating a process 700 for determining whether to accept/discard a cell and updating the accumulated discard probability. Referring to FIG. 7, the process 700 commences at block 705 where values for the particular class of service queue involved are gathered. These values include $Q_{AVG}$, $TH_{MAX}$, $TM_{MIN}$, $P_{MAXDISC}$, ACCUM_FACTOR, and current cell count. The process 700 then proceeds to block 710 where the instantaneous discard probability ($P_{INST}$) is determined. The process 700 then continues to block 715 where the discard probability ($P_{DISC}=P_{INST}+P_{ACCUM}$) is determined.

The process then moves to block 720, where the discard probability ($P_{DISC}$) is compared with a random number (between zero and one), which is generated by a pseudo-random number generator. If the discard probability is greater than or equal to (depending on the implementation) the random number, the current cell is discarded (block 725) and the accumulated probability is reset to zero (block 750). At block 720, if the discard probability is less than the random number, the process moves to block 730. At block 730 a determination is made as to whether $Q_{AVG}$ is greater than $TH_{MAX}$. If so, the process jumps to block 725 where the current cell is discarded and the accumulated probability is reset to zero (block 750). On the other hand, if $Q_{AVG}$ is not greater than $TH_{MAX}$, the process moves to block 735 where the current cell is accepted. The process then moves to block 740. At block 740, if the current cell count is equal to zero, the process moves to block 750 where the updated accumulated probability is reset to zero. On the other hand, if the current cell count is greater than zero, the process continues to block 745 where the accumulated probability $P_{ACCUM}$ is updated ($P_{ACCUM}=P_{ACCUM}+(ACCUM\_FACTOR*P_{INST})$). Note that the accumulated probability may be updated any time before block 745.

In one embodiment, the process 700 of FIG. 7 is implemented using a circuit, as illustrated by the exemplary RED circuit 430 of FIG. 6. Alternatively, the process 700 is implemented in software where the instructions are executed by a microcontroller, microprocessor, etc. That is, the calculations, comparisons, etc. of FIG. 7 may be implemented in a software subroutine or an equivalent. This software subroutine may be placed in any memory device (e.g., memory 242 or other memory device) and the function of the threshold circuit 425 may be performed by a microprocessor (e.g., replacing the threshold circuit with the microprocessor).

In the foregoing specification, the invention has been described with reference to specific exemplary embodiments thereof. It will, however, be evident that various modifications and changes may be made thereto without departing from the broader spirit and scope of the present invention as set forth in the appended claims. The specification and drawings are, accordingly, to be regarded in an illustrative rather than a restrictive sense.

What is claimed is:

1. A method for smoothing a rate of cell discards for random early detection in a communication device, comprising:

detecting a cell;

calculating an instantaneous discard probability;

updating a discard probability as a function of the instantaneous discard probability and an accumulated probability;

comparing the discard probability with a random number; and discarding the cell if the discard probability is greater than the random number.

2. The method of claim 1 wherein the cell is a start of frame cell.

3. The method of claim 1 wherein the cell is a start of packet cell.

4. The method of claim 1 wherein calculating the instantaneous discard probability comprises:

subtracting a minimum discard threshold value from an average queue length value to provide a first intermediate result;

subtracting the minimum discard threshold value from a maximum discard threshold value to provide a second intermediate result dividing the first intermediate result by the second intermediate result to provide a third intermediate result; and multiplying the third intermediate result by a maximum discard probability to provide the instantaneous discard probability.

5. The method of claim 1 wherein updating the discard probability comprises adding the instantaneous discard probability to the accumulated probability.

6. The method of claim 1 further comprising updating the accumulated probability by the instantaneous discard probability multiplied by an accumulation factor if the discard probability is less than the random number.

7. The method of claim 1 further comprising updating the accumulated probability by the instantaneous discard probability multiplied by an accumulation factor if the discard probability is less than the random number and a queue cell count is greater than zero.

8. The method of claim 1 further comprising:

if the discard probability is greater than the random number, discarding the cell; and clearing the accumulated probability.

9. The method of claim 1 further comprising clearing the accumulated probability if a queue cell count is equal to zero.

10. An apparatus, comprising:
a memory device including one or more instructions; and
a processor coupled to the memory device, the processor, responsive to the one or more instructions, capable of,
  detecting a cell,
  calculating an instantaneous discard probability;
  updating a discard probability as a function of the instantaneous discard probability and an accumulated probability,
  comparing the discard probability with a random number, and
  discarding the cell if the discard probability is greater than the random number.

11. The apparatus of claim 10 wherein the processor is a microcontroller.

12. The apparatus of claim 10 wherein the processor is a microprocessor.

13. The apparatus of claim 10 wherein the cell is a start of frame cell.

14. The apparatus of claim 10 wherein the cell is a start of packet cell.

15. The apparatus of claim 10 wherein the processor, responsive to one or more instructions, capable of,
  subtracting a minimum discard threshold value from an average queue length value to provide a first intermediate result;
  subtracting the minimum discard threshold value from a maximum discard threshold value to provide a second intermediate result;
  dividing the first intermediate result by the second intermediate result to provide a third intermediate result; and
  multiplying the third intermediate result by a maximum discard probability to calculate the instantaneous discard probability.

16. The apparatus of claim 10 wherein the processor, responsive to the one or more instructions, capable of updating the accumulated probability by the instantaneous discard probability multiplied by an accumulation factor if the discard probability is less than the random number.

17. The apparatus of claim 10 wherein the processor, responsive to the one or more instructions, capable of updating the accumulated probability by the instantaneous discard probability multiplied by an accumulation factor if the discard probability is less than the random number and a queue cell count is greater than zero.

18. The apparatus of claim 10 wherein the processor, responsive to the one or more instructions, capable of discarding the cell and clearing the accumulated probability if the discard probability is greater than the random number.

19. The apparatus of claim 10 wherein the processor, responsive to the one or more instructions, capable of clearing the accumulated probability if a queue cell count is equal to zero.

20. A communication device having input and output ports, comprising:
a memory element for storing cells received on input ports;
an arrival controller to determine whether to accept or reject cells, the arrival controller including a circuit that is capable of,
  detecting a cell,
  calculating an instantaneous discard probability,
  updating a discard probability as a function of the instantaneous discard probability and an accumulated probability,
  comparing the discard probability with a random number, and
  discarding the cell if the discard probability is greater than the random number, otherwise accept the cell; and
a departure controller to select cells from the memory element for transmitting to the output ports.

21. An apparatus, comprising:
means for detecting a cell;
means for calculating an instantaneous discard probability;
means for updating a discard probability as a function of the instantaneous discard probability and an accumulated probability;
means for comparing the discard probability with a random number; and
means for discarding the cell if the discard probability is greater than the random number.

22. The apparatus of claim 21, wherein the means for calculating comprises:
means for subtracting a minimum discard threshold value from an average queue length value to provide a first intermediate result;
means for subtracting the minimum discard threshold value from a maximum discard threshold value to provide a second intermediate result
means for dividing the first intermediate result by the second intermediate result to provide a third intermediate result; and
means for multiplying the third intermediate result by a maximum discard probability to provide the instantaneous discard probability.

23. A machine readable medium having stored thereon instructions, which when executed by a processor, cause the processor to perform the following, comprising:
detecting a cell;
calculating an instantaneous discard probability;
updating a discard probability as a function of the instantaneous discard probability and an accumulated probability;
comparing the discard probability with a random number; and
discarding the cell if the discard probability is greater than the random number.

24. The machine readable medium of claim 23, wherein calculating causes the processor to perform the following, comprising:
subtracting a minimum discard threshold value from an average queue length value to provide a first intermediate result;
subtracting the minimum discard threshold value from a maximum discard threshold value to provide a second intermediate result
dividing the first intermediate result by the second intermediate result to provide a third intermediate result; and
multiplying the third intermediate result by a maximum discard probability to provide the instantaneous discard probability.

25. The machine readable medium of claim 23, wherein updating causes the processor to perform the following, comprising adding the instantaneous discard probability to the accumulated probability.

26. The machine readable medium of claim 23, wherein the instructions cause the processor to further perform the following, comprising updating the accumulated probability by the instantaneous discard probability multiplied by an accumulation factor if the discard probability is less than the random number.

27. A method for random early detection, comprising:

generating a linear approximation of a non-linear discard probability curve to determine an accumulated probability; and calculating a discard probability based on the accumulated probability and an instantaneous probability.

28. The method of claim 27, wherein the linear approximation is based on a constant factor.

29. The method of claim 28, wherein the constant factor is a negative power of two.

* * * * *